(12) United States Patent
Lin et al.

(10) Patent No.: US 9,053,573 B2
(45) Date of Patent: Jun. 9, 2015

(54) SYSTEMS AND METHODS FOR GENERATING A VIRTUAL CAMERA VIEWPOINT FOR AN IMAGE

(75) Inventors: Dennis Lin, Urbana, IL (US); Quang H. Nguyen, Ho Chi Minh (VN); Minh N. Do, Urbana, IL (US); Sanjay J. Patel, Urbana, IL (US)

(73) Assignee: PERSONIFY, INC., Chicago, IL (US)

( * ) Notice: Subject to any disclaimer, the term of this patent is extended or adjusted under 35 U.S.C. 154(b) by 1076 days.

(21) Appl. No.: 13/098,363

(22) Filed: Apr. 29, 2011

(65) Prior Publication Data
US 2011/0267348 A1 Nov. 3, 2011

Related U.S. Application Data

(60) Provisional application No. 61/329,263, filed on Apr. 29, 2010.

(51) Int. Cl.
*G06T 15/20* (2011.01)

(52) U.S. Cl.
CPC ............ *G06T 15/20* (2013.01); *G06T 15/205* (2013.01)

(58) Field of Classification Search
None
See application file for complete search history.

(56) References Cited

U.S. PATENT DOCUMENTS

| | | | | |
|---|---|---|---|---|
| 6,084,979 | A * | 7/2000 | Kanade et al. | 382/154 |
| 8,106,924 | B2 * | 1/2012 | Aliprandi et al. | 345/629 |
| 2002/0061131 | A1 * | 5/2002 | Sawhney et al. | 382/154 |
| 2002/0158873 | A1 * | 10/2002 | Williamson | 345/427 |
| 2005/0094879 | A1 * | 5/2005 | Harville | 382/209 |
| 2010/0329358 | A1 * | 12/2010 | Zhang et al. | 375/240.26 |

* cited by examiner

*Primary Examiner* — Said Broome
(74) *Attorney, Agent, or Firm* — Invention Mine, LLC

(57) ABSTRACT

A color image and a depth image of a live video are received. A user is extracted from the information of the color image and the depth image. Spurious depth vales may be corrected. Points or pixels of an image as seen from a viewpoint of a reference camera at a reference camera location are mapped to points of the image as would be seen from a viewpoint of a virtual camera at a virtual camera location. As such, a transformed color image is generated. Disoccluded pixels may be processed to address any gaps within the transformed color image.

21 Claims, 11 Drawing Sheets

SYSTEMS AND METHODS FOR GENERATING A VIRTUAL CAMERA VIEWPOINT FOR AN IMAGE

RELATED APPLICATION

This application claims the benefit of U.S. Provisional Application No. 61/329,263 filed on Apr. 29, 2010 and entitled "Novel Viewpoint Generation Using Color Plus Depth Camera."

BACKGROUND OF THE INVENTION

1. Field of the Invention

The present invention is related to the field of video processing, and more specifically towards systems and methods for generating a virtual camera viewpoint for an image.

2. Art Background

Conventional video conferencing techniques typically comprise a camera mounted at one location and a user looking into a video screen at a second location. For example, the camera may be mounted on the top edge of a video display while a user may be staring into the screen of the video display. A first user looking at the screen of the video display would appear to be looking downwards to a second user who receives a video of the first user. As such, the positioning of the camera above the first user's eye gaze may make it difficult to establish eye contact between parties of a video conference.

Accordingly, it is highly desirable to develop systems and methods for generating a virtual camera viewpoint for an image. The systems and methods may provide video processing techniques such that an image of a user from a camera may be processed to make eye contact between the parties of a video conference possible.

SUMMARY OF THE INVENTION

The systems and methods disclosed herein generate a virtual camera viewpoint for an image. Specifically, the systems and methods may receive a depth image and a color image of a frame from a live video from at least one camera. A user or foreground portion of the video may be extracted from the live video. As such, a color image and a depth image or the user may be extracted. A virtual camera location comprising a second viewpoint of the color image is received. The second viewpoint may comprise a shill or change in location from a first viewpoint as comprised by the at least one camera. At least one pixel from the color image is translated to a transformed color image that comprises the second viewpoint of the color image from the virtual camera location. The translation may be based on the depth value of the pixel from the depth image.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

The systems, methods, and circuits disclosed herein relate to generating a virtual camera viewpoint for an image.

In the following detailed description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, and systems have not been described in detail to avoid unnecessarily obscuring aspects of the present invention.

Figure 1:
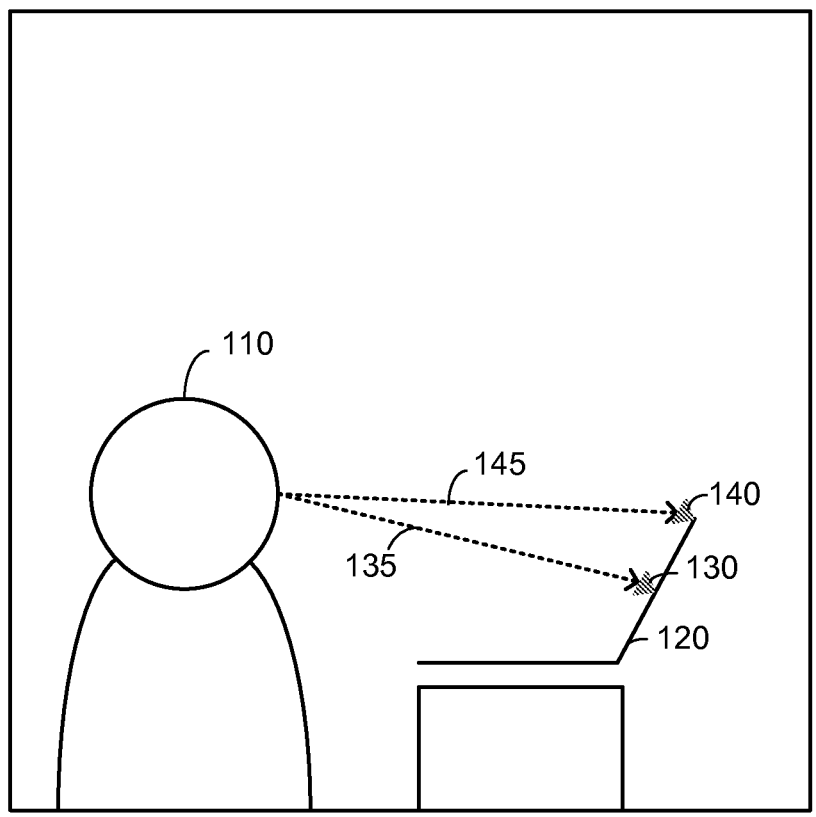
FIG. 1 illustrates an example of a user with an eye gaze towards a screen and a camera above the screen in accordance with some embodiments.

FIG. 1 illustrates an example setup of a user with an eye gaze towards a screen with a camera above the screen in accordance with some embodiments. In general, a user 110 is looking at a portion of a device 120. For example, the device 120 may comprise a laptop with video conferencing applications or software. The laptop may comprise a screen 130 and a camera 140. If the user 110 is staring at the screen 130, then the user's eye gaze 135 may be towards the screen 130. However, the camera 140 may be taking images and/or video of the user 110. As such, when the image and/or video of the user 110 is transmitted to another party of the video conference, the user 110 may appear to be looking off center (e.g., looking down) or not making eye contact with the other party of a video conference. Eye gaze 145 from the user 110 to the camera 140 would result in the user 110 not looking off center, but then the user 110 would not be establishing eye contact with the other party of the video conference. Thus, although the user 110 may have an eye gaze 135 looking into the screen 130, the generation of a virtual camera viewpoint of an image as received by the camera 140 may address the issue of eye contact or eye gaze. For example, if the virtual camera viewpoint is located at the location of the screen 130 while the user 110 has eye gaze 135, then a virtual camera viewpoint may comprise processing the image such that while the user 110 is looking at the screen 130 with eye gaze 135 away from the camera 140, the virtual camera viewpoint may be located at the screen 130. As such, while the image of the user 110 looking at the screen 110 is processed by the camera 140, a transformed image may be generated such that it appears that the user 110 is looking into the screen 130 and that a camera is behind the screen 130.

Although FIG. 1 describes one such arrangement of a mismatch between the user eye gaze from an actual camera and a desired virtual camera viewpoint, other arrangements may exist. For example, a user may look at an audience while an actual camera is mounted on top of a laptop display. As such, the user may appear to look up and/or lean backwards on the captured video of the camera on top of the laptop. Moreover, in some embodiments, the eye gaze mismatch may occur when the user is looking at a computer monitor, but the actual camera is placed to the side of the computer monitor. As such, the user may appear to look away or towards one side when a video or image of the user is captured by the camera. Either of these arrangements, or any other arrangement, may use the systems and methods herein to generate a virtual camera viewpoint of an image.

As such, the image of a user is recorded by a camera. The user is looking or comprises an eye gaze away from the camera recording the user. However, the image of the user is processed such that a virtual camera viewpoint of the image is generated. Thus, the virtual camera viewpoint approximates the scene or image captured by the camera, but from the perspective of a virtual camera location.

Figure 2:
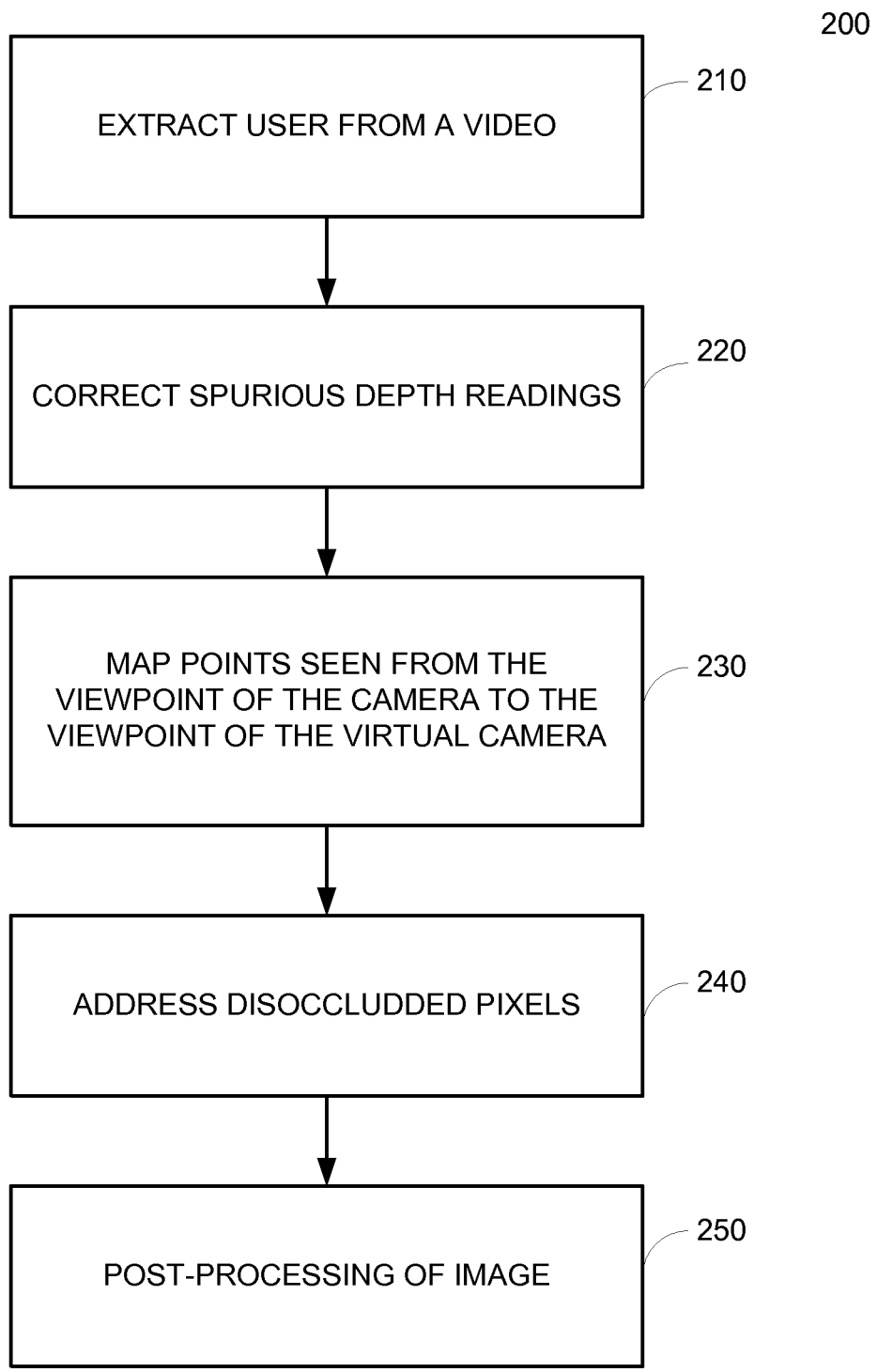
FIG. 2 illustrates a flow diagram of a method for generating a virtual camera viewpoint of an image of a video in accordance with some embodiments.

FIG. 2 illustrates a method 200 for generating a virtual camera viewpoint of an image in accordance with some embodiments. In general, the method 200 extracts a user from a video by using a depth image and a color image and maps points or pixels seen from a viewpoint of the camera to a viewpoint of a virtual camera.

As seen in FIG. 2, at block 210, a user is extracted from a video comprising a color image and a depth image. For example, the user is detected in a foreground and separated from the background of the video. Further details with regard to the user extraction of block 210 are described with relation to FIGS. 3 and 4.

At block 220, spurious depth values from the extracted user video are corrected. For example, a bilateral filter may be applied to regions or pixels where the depth value comprises an unknown depth value. In some embodiments, the bilateral filter may drop off in terms of space and similarity of nearby pixels. A measure of similarity of nearby pixels may be determined by information from the color image. For example, using a Gaussian kernel in conjunction with the color image information, the following equation may determine the output of the bilateral filter:

$$BF[D]_p = \frac{1}{W_p} \sum_{q \in S} G_{\sigma_s}(\|p - q\|) G_{\sigma_r}(\|RGB_p - RGB_q\|) D_q$$

In some embodiments, $BF[D]_p$ comprises the output of the bilateral filter at a point P, $W_p$ comprises a weighting factor, S comprises a neighborhood of P, $RGB_x$ comprises the color value at x, $D_q$ comprises the depth value at q, and $G_\sigma$ comprises a Gaussian kernel. As previously discussed, the bilateral filter may be applied to regions where the depth value is unknown. In some embodiments, applying the bilateral filter to such regions preserves image fidelity and reduces computational resources. In some embodiments, a camera may further provide a confidence value for each corresponding depth value for each pixel (e.g., through a reflected infrared intensity). As such, the bilateral filter may be applied to pixels with a confidence value at, below, or above a defined threshold value of the confidence value. In some embodiments, the bilateral filter may be applied repeatedly in order to gradually fill a large region comprising pixels of an unknown depth value.

An alternative method to correct spurious depth values may comprise fitting a plane on the set of three dimensional (3D) points corresponding to depth pixels on the unknown region comprising unknown pixels. In some embodiments, such a method may approximate the extracted user with a 3D plane similar to a cardboard cutout. The fitting of the 3D plane may leverage the averaging effect to provide a robust estimation of the depth values of the unknown pixels and may correct missing depth values. In some embodiments, such a method may be used in conjunction with the bilateral filter as previously described.

At block 230 of FIG. 2, pixels or points seen from the viewpoint of the reference or actual camera are mapped or translated to points seen from a viewpoint of a target or virtual camera. Further details with regard to the mapping of pixels or points from the viewpoint of the actual camera to the points seen from a viewpoint of a virtual camera are described with relation to FIGS. 6, 7, 8, and 9. At block 240, disoccluded pixels are addressed or processed. Further details with regard to the addressing or processed of disoccluded pixels are described below. At block 250, post-processing of the resulting transformed image reflecting the new viewpoint of a virtual camera is performed. For example, a blurring or bilateral filter may be applied to smooth the transformed image. In some embodiments, a morphological or connected component analysis may be used to eliminate artifacts in the transformed image.

Figure 3:
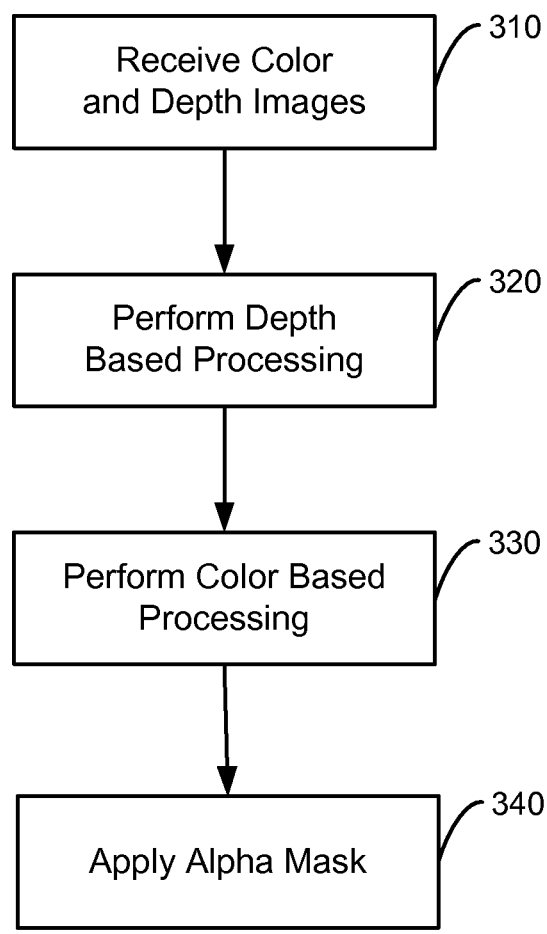
FIG. 3 is a flow diagram illustrating an example embodiment of a method for accurate user foreground video extraction.

FIG. 3 illustrates an example method 300 for accurate user foreground video extraction. In some embodiments, the identified background portion may be removed to create a foreground video. In general, the method 300 processes a depth image and a color image to extract a user foreground video.

As seen in FIG. 3, at block 310, a color image and a depth image is received. The depth image may comprise information indicating the distance of each pixel of an image frame of a video from a sensor. The color image may comprise color pixel information of an image frame of a video. The depth and color camera information may be received from a three dimensional (3D) camera, depth camera, z-camera, range camera, or from a plurality of sources. For example, the color information may be received from a color camera and the depth information may be received from a depth camera. In some embodiments, the color information and depth information may be received from a single camera. For example, the color information may be received from a red-blue-green (RGB) sensor on a camera and the depth information may be received from an infrared (IR) sensor comprised within the same camera. Further details with regard to the camera are described with relation to FIG. 10. As such, the method 300 receives depth and color information of a video. At block 320, the depth image is processed as further discussed with relation to FIG. 4. At block 330, the color image is processed as discussed in more detail with relation to FIG. 5. Finally, at block 340, an alpha mask may be applied to the resulting image.

Figure 4:
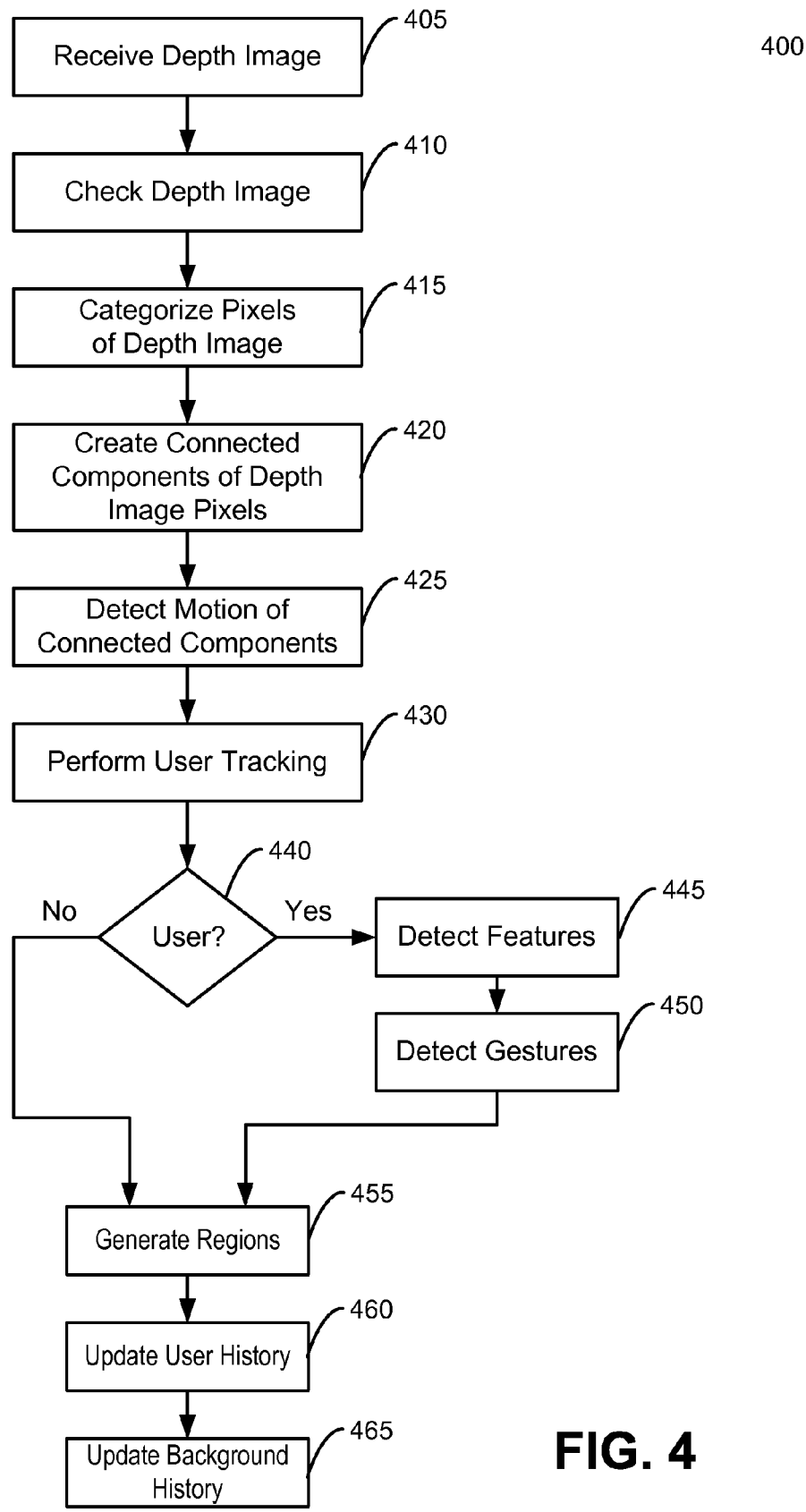
FIG. 4 is a flow diagram illustrating an example embodiment of a method for depth based processing for identifying a foreground portion and a background portion of a video.

FIG. 4 illustrates a method 400 for depth based processing for the identifying of a foreground portion and a background portion of a video. In some embodiments, the identified background portion may be removed to create a foreground video.

In general, the method 400 receives depth image information and categorizes image pixels based on the depth image information.

As seen in FIG. 4, at block 405, a depth image is received. At block 410, the depth image is checked. In some embodiments, upon receiving a new depth image frame from a camera, the depth image frame is checked to determine whether the depth information is useful. For example, if the majority of pixels from the depth image comprise small or invalid values then the depth image frame may be considered to not be useful and as such may be discarded. In some embodiments, if a depth image frame is discarded then all pixels in the region map (described in more detail below) are set to 'unknown.' Moreover, in some embodiments, if a large number of consecutive depth image frames (e.g., 20 consecutive frames) comprise invalid depth information, then all depth histories (described in further detail below) and user information may be cleared or deleted.

At block 415, individual pixels of the depth image frame are categorized. Each pixel may be categorized or determined to belong to a section of the depth image frame. For example, each pixel may be categorized as unknown, background, a user pixel, or as a bad pixel. In some embodiments, there may be a plurality of types of user pixels. For example, each user may comprise a separate user pixel identification in order to keep different users separate. In some embodiments, the categorization of the pixels is based on a background history and user histories. Each of the background history and each user history comprises an aggregate history of the background pixels and user pixels as compiled from previous depth image frames. For each pixel of a received depth image frame, the current depth value is compared to the depth value in the background and foreground histories and ideally matched as either background or a user. In some embodiments, how close a pixel's current depth value must match either of the background or user histories may be based upon a confidence level threshold of the pixel. For example, to determine the best match (e.g., whether the pixel is a user or background) may comprise a cost calculated for each history and the history with the lowest cost may be chosen to be the pixel's section or categorization. If the depth value of a current pixel does not match any of the background or user histories, then the pixel may be labeled as unknown. In some embodiments, if the pixel has an invalid depth value or a depth value beyond a threshold, then the pixel may be labeled as an invalid pixel (e.g., a bad pixel).

As seen in FIG. 4, at block 420, connected components of the depth image pixels are created. In some embodiments, the creation of connected components may group pixels into components based on the pixel's section or categorization and the pixel's depth value. For example, each pixel's depth value and categorization (i.e., user, unknown, or background) may be compared with its neighboring pixels' depth value and categorization. In some embodiments, the categorization may comprise a different categorization for each user. As such, a plurality of user categorizations may be used. If neighboring pixels share a common categorization and have similar depth values, then the neighboring pixels may be considered to be a part of a single component. However, for pixels that are categorized as having an invalid depth, the pixel's depth value is not compared with a neighboring pixel's depth value. As such, neighboring pixels with an invalid depth categorization will be grouped into a single component. In some embodiments, in order to reduce computational resources, disjoint sets are used to manage the connected components. Once the connected components are determined (e.g., components are created for foreground components, background components, etc.) each component comprising the pixels categorized as unknown are examined. A determination may be made to decide whether the unknown component is connected to a known component such as a background or foreground component. For example, for each unknown component, a list of connections to known categorized components is generated. If the unknown component is connected to one or more known categorized components, then the categorized component selected for the unknown component is based on the total number of connections and the total depth difference between the unknown component and the categorized component. For example, if an unknown component comprises a large number of connections to a background component and there is a small depth difference between the unknown component and the background component, then the unknown component may be categorized as a background component. As such, all pixels in the unknown component may be categorized as a background component and included in the background component. Thus, the previously unknown pixels are regrouped into the background component pixels.

At block 425 of FIG. 4, a motion detection of connected components is performed. The motion detection determines if a component is moving between depth image frames. A moving component may be determined to be a person (e.g., a user). As such, a user may be detected at block 425. In some embodiments, a camera may provide an infrared intensity image and as such the difference between the infrared intensity or depth value of the current image frame and a previous image frame may be calculated. If a pixel's infrared intensity increases by a significant amount and the pixel's value is below a specific threshold, then the pixel may be marked as moving. In embodiments where the camera does not provide an infrared intensity image, a pixel may be considered to be moving if its depth value decreases by a specific amount and the pixel depth value is below a specific threshold. Each component comprising a moving pixel may be further examined. If the number of moving pixels in a single component is above a predefined minimum amount and the percentage of moving pixels is not small relative to all pixels of the component, then the component may be tagged as being in motion and as such may comprise a user.

As seen in FIG. 4, at block 430, user tracking is performed on the connected components. In some embodiments, user tracking may be performed at every few frames and result in the analysis of all of the connected components. In some embodiments, a connected component in motion must have a user head detected in order for the connected component to be categorized as a user. For example, for an unknown component, the user tracking may comprise checking the unknown component to determine whether the unknown component should be a foreground component or if it is a part of an existing foreground component (e.g. the unknown component is a user). If the unknown component is not part of an existing user, then the unknown component may be a new user and thus is analyzed through additional processes at blocks 445 and 450. Similar processes are performed for a background component. However, for a background component to be re-categorized as a foreground or user component, the background component must be approximate to a user's center of mass. Moreover, in some embodiments, a new user must have additional features detected and must be in motion. If a background component is determined to be a part of a user or a new user, then the component is removed from the background history.

The performance of the user tracking at block 430 may further comprise processing checks on foreground or user components. For example, if a foreground or user component is far from a user's center of mass, then it may be re-categorized as an unknown component. If a user component is close to another user's center of mass, then it may be removed from the current user and into the second user's history. In some embodiments, following the previously described processing steps, the user's information may be updated based on the current frame. For example, information related to a user's center of mass, dimensions, and motion may be updated. As such, the positioning and placement of a user may be detected such that a user's gestures may be detected, as described in further detail below. In some embodiments, a detected gesture from a user may enable or disable the user from the system or the user's standing placement (e.g., depth threshold) may be used to enable or disable the user. As such, a history of various characteristics of a user are recorded and updated.

If it is determined that a component is a user at block 440, then at block 445, the user's features are detected. In some embodiments, the features detected may comprise a user's head and hands. To do so, the user's torso and neck may first be located by segmenting the user component into a plurality of horizontal slices and moving upward until the width of the horizontal slices begins to diverge from the average width by a set amount. After finding the user's torso and neck, the user's head is identified by examining an area above the identified neck. Once the user's head is found, then the user's hands may be identified by performing a skeletonization of the user component. In some embodiments, the user's hands may be assumed to be the furthest points to the left and the right of the user's torso.

As seen in FIG. 4, at block 450, a user component's gestures are detected. As such, at block 450, a user raising his or her hand may be detected. In some embodiments, the detection of a user's gestures is based on the previously provided position of the user's features. In some embodiments, a user raising his or her hand may be detected by a vertical line comprising the user's hand position as well as a distance.

At block 455, a region map may be created. In some embodiments, the region map may be created based on the previously discussed categorizations and user information. The region map may comprise values of foreground, background, unclear, and unknown. For a background component, the region is set to background. In some embodiments, an invalid depth component may be set to unknown. If the component is set to unknown, then it may be checked to see whether it is close in proximity to a user such that it may be considered to be part of the user and as such categorized as an unclear component. If the user is enabled then the user component may remain as a foreground component, but if the user is disabled, then the user component may be re-categorized as a background component. As such, in some embodiments, the region map may comprise a categorization of pixels and/or components as foreground, background, unclear, or unknown.

At block 460 in FIG. 4, user histories may be updated. In some embodiments, a user history is recorded and updated for each user. Each pixel in the user history may comprise a depth value and a confidence level. In some embodiments, the user history is updated for each received depth frame. The depth values may be updated using an exponential moving average. The confidence level may be updated so as to increase whenever a pixel is categorized as a user and the depth value is similar to the depth value in the user history. However, if the depth value is significantly different, then the confidence level may decrease. If a pixel is labeled as a background then the confidence level decreases, but if a pixel is labeled as another user, then the user confidence may decrease more slowly. As such, the user histories enables the systems and methods disclosed herein to determine which pixels are associated to which user in a following frame.

At block 465, a background history may be updated similar to the user history as previously described. In some embodiments, the background history may comprise two different types of histories such as a trusted and non-trusted history. The non-trusted history may be updated per each frame. When a pixel is labeled as a background and the depth value matches the depth value in the non-trusted history then the age of the pixel increases. If the age of the pixel reaches a defined minimum age, then the pixel is re-categorized as trusted. If the depth value continues to match the depth value in the trusted history, then the confidence level may increase. However, if the depth value does not match, then the confidence level will decrease and if the confidence level reaches zero then the history at the pixel may be re-categorized as non-trusted.

Figure 5:
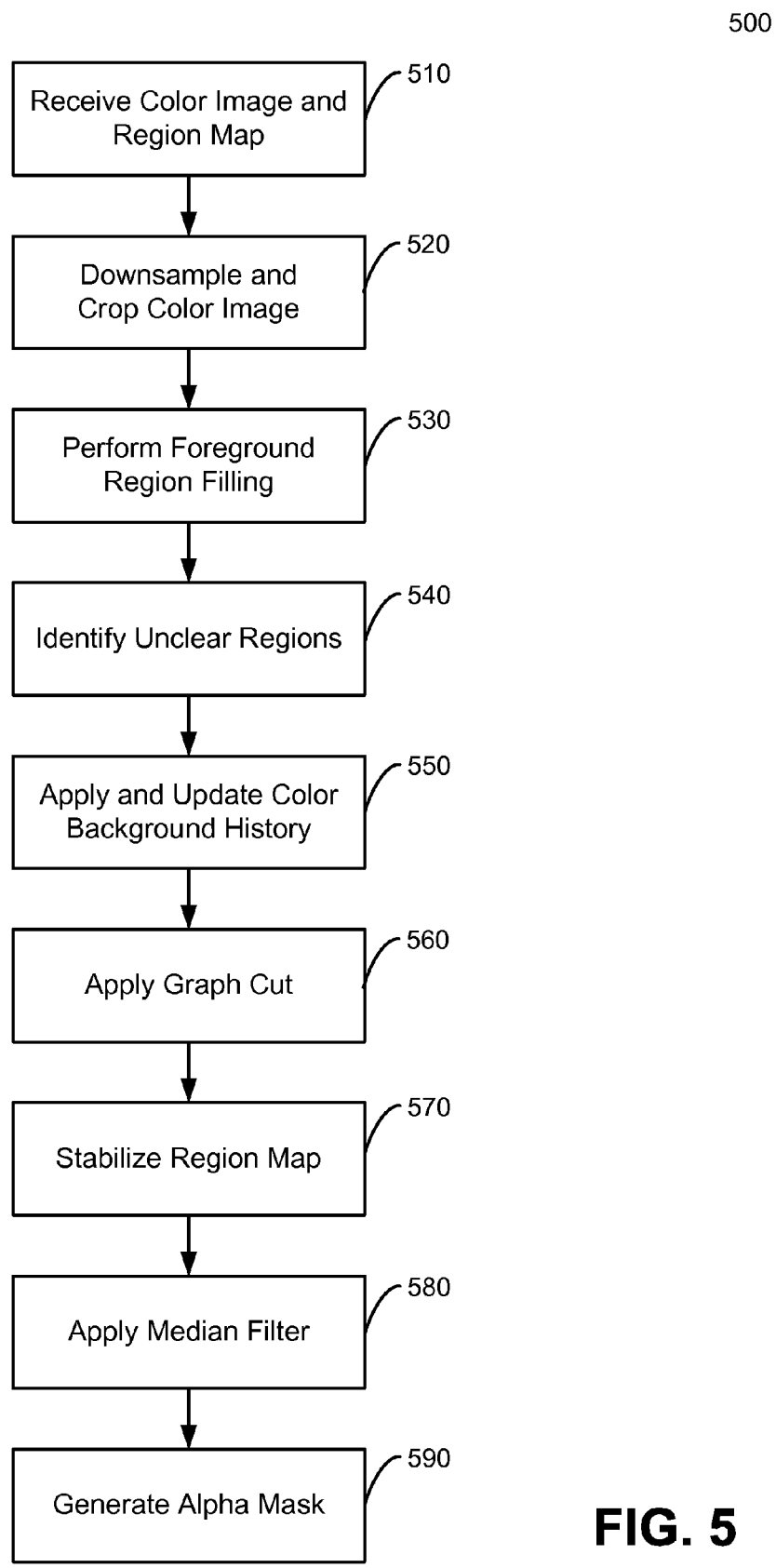
FIG. 5 is a flow diagram of a method for color based processing for the identification of a foreground portion and a background portion to extract a user foreground video.

FIG. 5 illustrates a flow diagram of a method 500 for color based processing for the identification of a foreground portion and a background portion to extract a user foreground video. At block 510, a color image is received. In some embodiments, a region map as previously discussed with regard to FIG. 4 may also be received. At block 520, the received color image may be down sampled and cropped. For example, if the resolution of the color image is high definition (HD), the color image may be down sampled to a lower resolution, such as a VGA-equivalent size (e.g., 640×480 resolution). In some embodiments, the boundaries of the received color image may not comprise depth information. As such, the boundaries of the color image may be cropped out or removed so that further processing on the color image may be more efficient.

At block 530 of FIG. 5, a foreground region filling may be performed. For example, in some instances, the depth image as received in FIG. 5 may comprise a reduced resolution than that of the color image. In such an instance, a warped foreground region may comprise a sparse set of pixels while unknown pixels within the sparse set of pixels should be labeled as foreground pixels. As such, for each unknown pixel, a local window surrounding the pixel may be searched for other foreground pixels. If the unknown pixel is surrounded by foreground pixels, then it may be assumed that the unknown pixel lies within the sparse set of foreground pixels and should thus be re-categorized or labeled as a foreground pixel.

At block 540, unclear regions of the color image may be identified and segmented out of the foreground and background regions of the color image so that further processing may be performed on the unclear region. The unclear region may comprise the area or set of pixels of which may not yet be categorized as a background pixel or a foreground pixel. As previously discussed, foreground region filling may be performed on unknown pixels that are surrounded by foreground pixels. However, if an unknown pixel is not surrounded by foreground pixels, then it may be comprised within an unclear region. For example, an unclear region may comprise pixels at the position of a user's hair. An unclear region surrounding a user's body may be further identified by expanding the contour line of the user body outwards and/or inwards to become a region. As such, unclear regions may be identified.

At block 550, a color background history may be applied and updated. The color background history may comprise the accumulated color values of a plurality of color images. In some embodiments, the color background history may be used to remove unclear head pixels from the unclear region that comprise color values that are similar with the corresponding color values in the color background history. In some embodiments, the application of the color background history may be performed before the processes described with relation to block 540 so as to create a more efficient color image process. The color background history may also be used when applying a graph cut as described in further detail below.

At block 560, a graph may be constructed. For example, a graph may be constructed by all of the pixels in the identified unclear region, along with any foreground and background pixels that is adjacent to the unclear region. Each pixel is then connected to its 4 or 8 neighboring pixels and a source that represents the foreground and a sink that represents the background. In some embodiments, N-links may be inter-pixel links. Terminal links (T-links) may comprise links connecting a pixel to the source or the sink. The capacities of the N-links may be assigned based on the color contrast (L1 norm) between pixels based on the following equation:

$$cap_N(i, j) = \begin{cases} \lambda_N e^{-\beta_N \|p_i - p_j\|_1} & \text{if } \|p_i - p_j\|_1 < \delta_N \\ 0 & \text{else} \end{cases}$$

The capacities of the T-links may comprise the summation of several factors. One such factor may comprise the probability with respect to the Gaussian mixture models of the background and the Gaussian mixture model of the foreground. These models may be learned and updated using the detected background pixels from the previous color image frames. Another factor may comprise the temporal coherence of the region map of the current image frame and the region map of the previous image frame. For each pixel i in the graph, a value cap(i) (capacity) may be defined as the following equation:

$$cap(i) = \begin{cases} \lambda_T e^{-\beta_T \|p_i^{current} - p_i^{previous}\|_1} & \text{if } \|p_i^{current} - p_i^{previous}\|_1 < \delta_T \\ 0 & \text{else} \end{cases}$$

If the pixel i is categorized as a foreground pixel in the previous image frame's region map, then $cap_{source}(i)=cap(i)$ and $cap_{sink}(i)=0$. However, if the pixel i is categorized as a background pixel in the previous image frame's region map, then set $cap_{source}(i)=0$ and $cap_{sink}(i)=cap(i)$.

A third factor may comprise the color contrast (L1 norm) between a pixel in the graph and its color background history, as in the following equation:

$$cap_{source}(i) = 0;$$

$$cap_{sink}(i) = \begin{cases} \lambda_T e^{-\beta_T \|p_i^{current} - p_i^{previous}\|_1} & \text{if } \|p_i^{current} - p_i^{previous}\|_1 < \delta_T \\ 0 & \text{else} \end{cases}$$

In some embodiments, the $cap_{source}$ of the foreground pixels in the graph may be set to a large enough constant number to prevent its categorization as a background pixel by the graph cut algorithm. Similarly, the $cap_{sink}$ of the background pixel must also be set to a large constant number. As such, a fast binary graph cut may be performed on the graph based on a number of factors to obtain a segmentation between the foreground and background.

At block 570, the region map may be stabilized in order to reduce small temporal flickering of the foreground-background edges (e.g., edge waviness artifacts). Noisy pixels may be detected in the unclear region of the region map before the graph cut is performed by counting the foreground to background and background to foreground transition time of each pixel. For every new frame and for each pixel of the new frame, if the pixel doesn't transition from one categorized region to another categorized region (e.g., from a foreground region to a background region), its transition count may decrease. However, if the pixel does transition from a categorized region to another categorized region (e.g., from a background region to a foreground region), then the pixel transition count may increase. If a pixel's transition count is above a threshold value, the region categorization of the pixel may be copied from the pixel's region categorization from the previous image frame's region map.

In some embodiments, at block 580, a median filter may be applied to the identified foreground region in order to smoothen the foreground edges. The median filter may be applied in the following pseudo code manner:

```
For each pixel p in UC region
{
Count = 0;
  For each pixel p_i in the NxN support window around pixel p {
    If R(p_i) = UC, count++;
  }
  If (count<N*N/2), R(p) = BG;
  Else R(p) = FG;
}
```

At block 590, an alpha mask may be generated to convert the foreground categorized pixels to a 0xFF alpha value and convert other categorized pixels to a 0x00 alpha value. In some embodiments, this may comprise an up sampling for the alpha mask.

Figure 6:
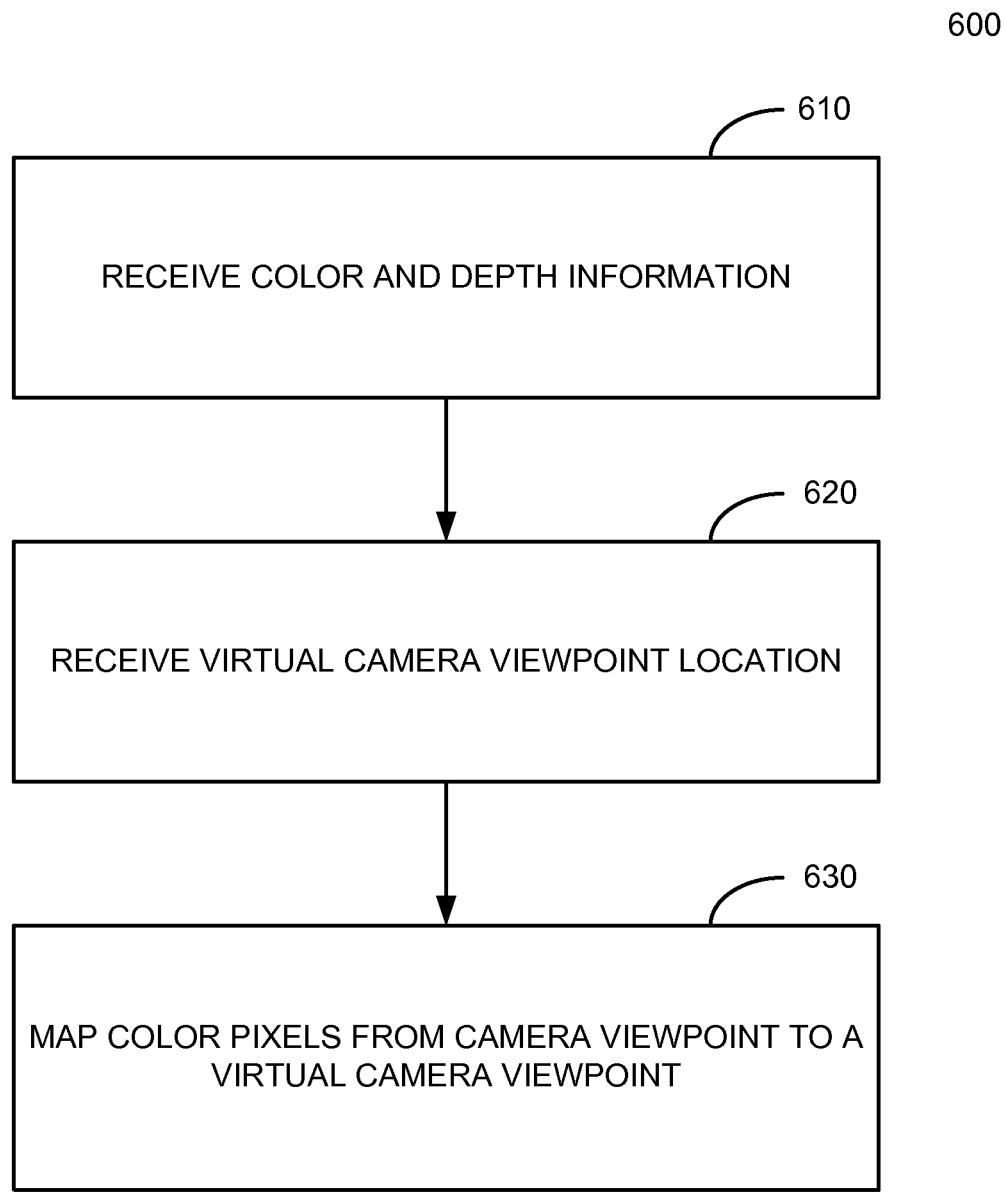
FIG. 6 is a flow diagram of an example method for mapping pixels from an image to points from a virtual camera viewpoint of the image.

FIG. 6 illustrates an example method 600 for mapping or translating pixels from an actual camera center or viewpoint of an image to points of a virtual camera center or viewpoint. In general, the method 600 receives color and depth information and maps or translates color pixels from an image from an actual camera viewpoint to a virtual camera viewpoint of the image.

As seen in FIG. 6, at block 610, color and depth information is received. In some embodiments, the color and depth information comprises color and depth information of a foreground or user extracted from a video as previously discussed. At block 620, a virtual camera viewpoint location is received. In some embodiments, the virtual camera viewpoint location is received from a user input or automatically detected or provided. At block 630, pixels or points of an image as seen from a reference or actual camera are mapped to points corresponding to a viewpoint of a virtual camera. In some embodiments, the mapping of pixels or points may comprise reversing the projection matrix of the camera to find world coordinates of every point or pixel seen in 3D. The projection matrix of a viewpoint of a virtual camera may then be applied to generate an output image reflecting the viewpoint of the virtual camera. Each point of an image in 2D space may be mapped one-to-one with a ray in 3D space that may intersect the camera position or viewpoint. For example, a 2D image plane comprising basis vectors ($\vec{s}$, $\vec{t}$) and a 3D space comprising vectors ($\vec{i}, \vec{j}, \vec{k}$) may comprise a 2D point to 3D ray mapping relationship as the following formula:

$$\vec{r} = \begin{bmatrix} r_i \\ r_j \\ r_k \end{bmatrix} = \begin{bmatrix} \vec{s}_{ijk} & \vec{t}_{ijk} & f*\vec{w}_{ijk} \end{bmatrix} \begin{bmatrix} u \\ v \\ 1 \end{bmatrix} = P \begin{bmatrix} u \\ v \\ 1 \end{bmatrix}$$

In some embodiments, (u,v) may comprise the 2D coordinate of a point in the image plane, $\vec{r}$ may represent the corresponding 3D ray direction, $\vec{s}_{ikj}$, $\vec{t}_{ijk}$ and $\vec{w}_{ijk}$ may comprise representations of $\vec{s}$, $\vec{t}$ and the viewing direction, $\vec{w}$ in $\{\vec{i},\vec{j},\vec{k}\}$, and f may comprise the focal length of the camera. In some embodiments, the matrix P of the above formula may be a mapping matrix. A point X in 3D space $\{\vec{i},\vec{k},\vec{k}\}$ may next be used. For example, $\vec{x}_r$ and $\vec{x}_d$ may respectively comprise homogeneous coordinates of X in the reference or original image plane and the target, desired, or virtual image plane. $P_r$ and $P_d$ may comprise mapping matrices of the reference or actual camera and the target or virtual camera. The mapping equation between $\vec{x}_r$ and $\vec{x}_d$ may then be defined as:

$$\vec{x}_d = P_d^{-1}\left(\frac{|P_r\vec{x}_r|}{d(\vec{x}_r)}(C_r - C_d) + P_r\vec{x}_r\right)$$

In some embodiments, $d(\vec{x}_r)$ may be the depth value of points $\vec{x}_r$, $C_r$ may comprise the center of the reference or actual camera, and $C_d$ may comprise the center of the target or virtual camera. As such, the above equation may be used to map each pixel or point from a viewpoint of an image from a camera to a point associated with a viewpoint of the image from a virtual camera or position.

Figure 7:
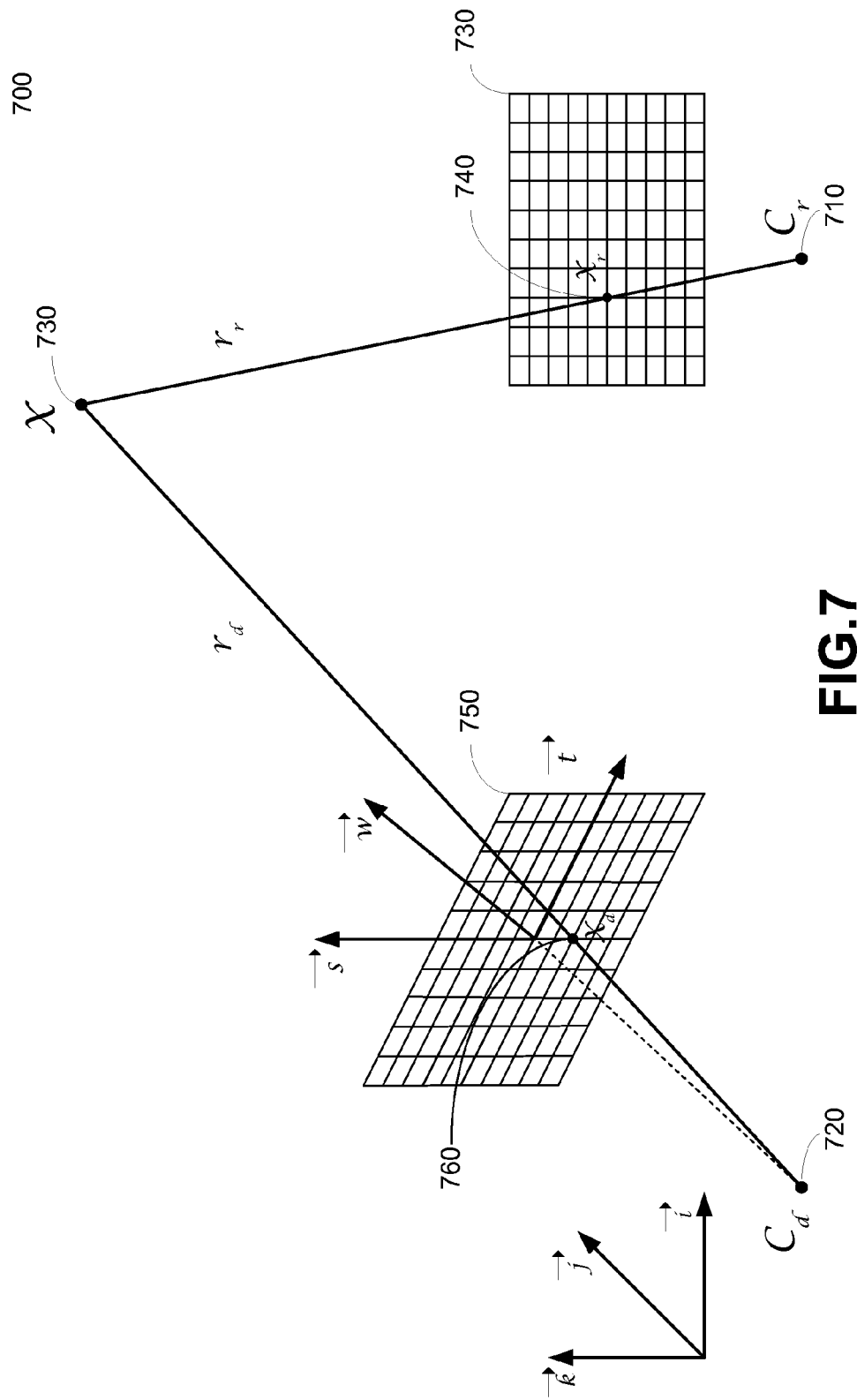
FIG. 7 illustrates an example of a pixel of an image mapped to a point of a virtual camera viewpoint of the image.

FIG. 7 illustrates an example mapping 700 of a point 730 of an object from a reference or actual camera center mapped to a point of a target or virtual camera viewpoint. In general, points or pixels of an image from a camera are mapped to a point associated with a viewpoint from a target or virtual camera center.

As seen in FIG. 7, the mapping 700 comprises a reference or actual camera center 710 and a target or virtual camera center 720. The point 730 of an object is received by the reference or actual camera 710 as point or pixel 740 on the image 730. The point or pixel 740 may be mapped to a transformed image 750 comprising a viewpoint of the point 730 of the object from a target or virtual camera center 720. As such, the transformed image 750 comprises a shift or transformation of the image 730. In some embodiments, each pixel of the image 730 comprising representations of a plurality of points of an object may be mapped to a pixel or location of the transformed image 750.

Figure 8:
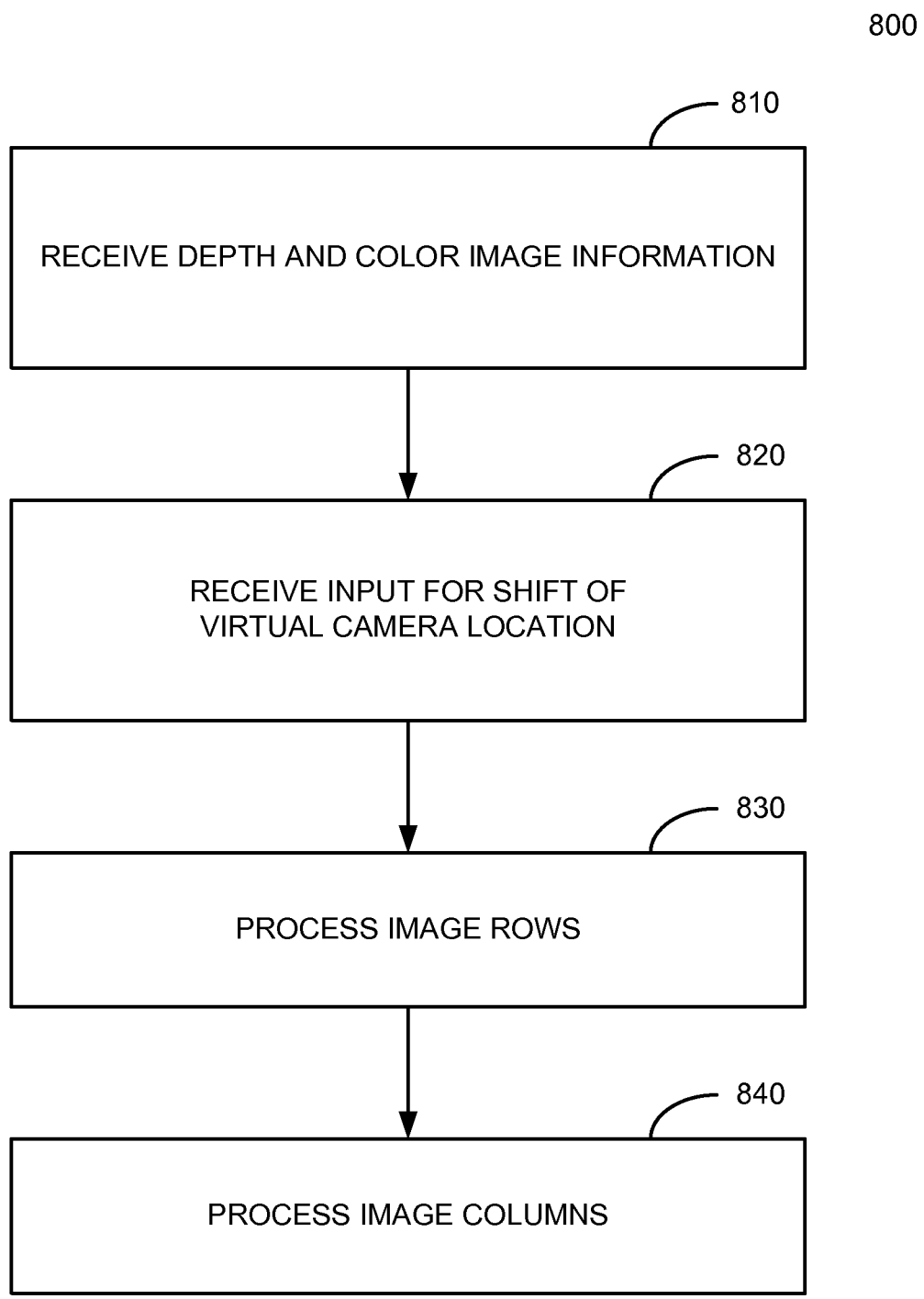
FIG. 8 is a flow diagram of a method for translating pixels from an image to points of a virtual camera viewpoint by shifting by rows and columns in accordance with some embodiments.

FIG. 8 illustrates an example method 800 for translating or mapping points or pixels from an image to points of a virtual camera viewpoint by shifting by rows and columns of the image. In some embodiments, the method 800 may comprise an alternative to the method 600 of FIG. 6. In general, the method 800 receives color and depth information and translates color pixels or points from a camera viewpoint to points of a virtual camera viewpoint.

As seen in FIG. 8, at block 810, color and depth information is received. In some embodiments, the color and depth information may comprise a color image and a corresponding depth image. The color image and the corresponding depth image may be that of a user or foreground extracted from a video as previously described. At block 820, an input for shifting or translating of the camera center to a virtual camera viewpoint is received. For example, the input may comprise shifting the camera center of the image by 30 centimeters to the left. As such, a virtual camera viewpoint may be located 30 centimeters to the right from the actual camera center. In some embodiments, the input may comprise a horizontal shift and a vertical shift. For example, the input may comprise a shifting of the camera center of the image by 25 centimeters to the right and 15 centimeters upwards. As such, the input comprises a horizontal shift of 25 centimeters and a vertical shift of 15 centimeters. Thus, a virtual camera location may be shifted in any direction (e.g., up, down, left, and right) in one or both of a vertical dimension and a horizontal dimension. At block 830, each of the rows of the image are processed to reflect the virtual camera location and, at block 840, each of the columns are processed to reflect the virtual camera location.

In some embodiments, the horizontal and/or vertical shilling from an actual camera center or viewpoint to a virtual camera center or viewpoint comprises shifting pixels of the image in a particular image dimension (e.g., horizontal or vertical). As such, in some embodiments, the camera center or viewpoint of an image is translated or moved to a virtual camera center or viewpoint along horizontal and vertical dimensions. As previously discussed with regard to blocks 830 and 840 of FIG. 8, the image is processed row by row and column by column. As such, the processing of the image may be more efficient. For example, if the shift of the camera center or viewpoint to the virtual camera center or viewpoint is only along a horizontal dimension, then the image may be processed row by row. Likewise, if the shift of the camera center or viewpoint to the virtual camera center or viewpoint is only along a vertical dimension, then the image may be processed column by column. However, if a shift of the camera center, viewpoint, or location is along both horizontal and vertical dimensions, then both a row by row and column by column shift may occur. Thus, the shifting of columns and rows of an image may be restricted to a sequence of one dimensional transformations (i.e., a row by row transformation followed by a column by column transformation or a column by column transformation followed by a row by row transformation).

In some embodiments, the amount of pixels or pointed shifted due to the shift of the camera center or viewpoint to a virtual camera center or viewpoint is determined by the following formula:

$$\Delta v = \frac{ft}{z(v,t)}$$

In some embodiments, f may comprise the focal length of the camera, t comprises the amount of translation from the reference or actual camera to the target or virtual camera location, and z(v,t) comprises the depth value of the pixel v at the reference or actual camera. As such, the amount of shift is based on the depth value.

Figure 9:
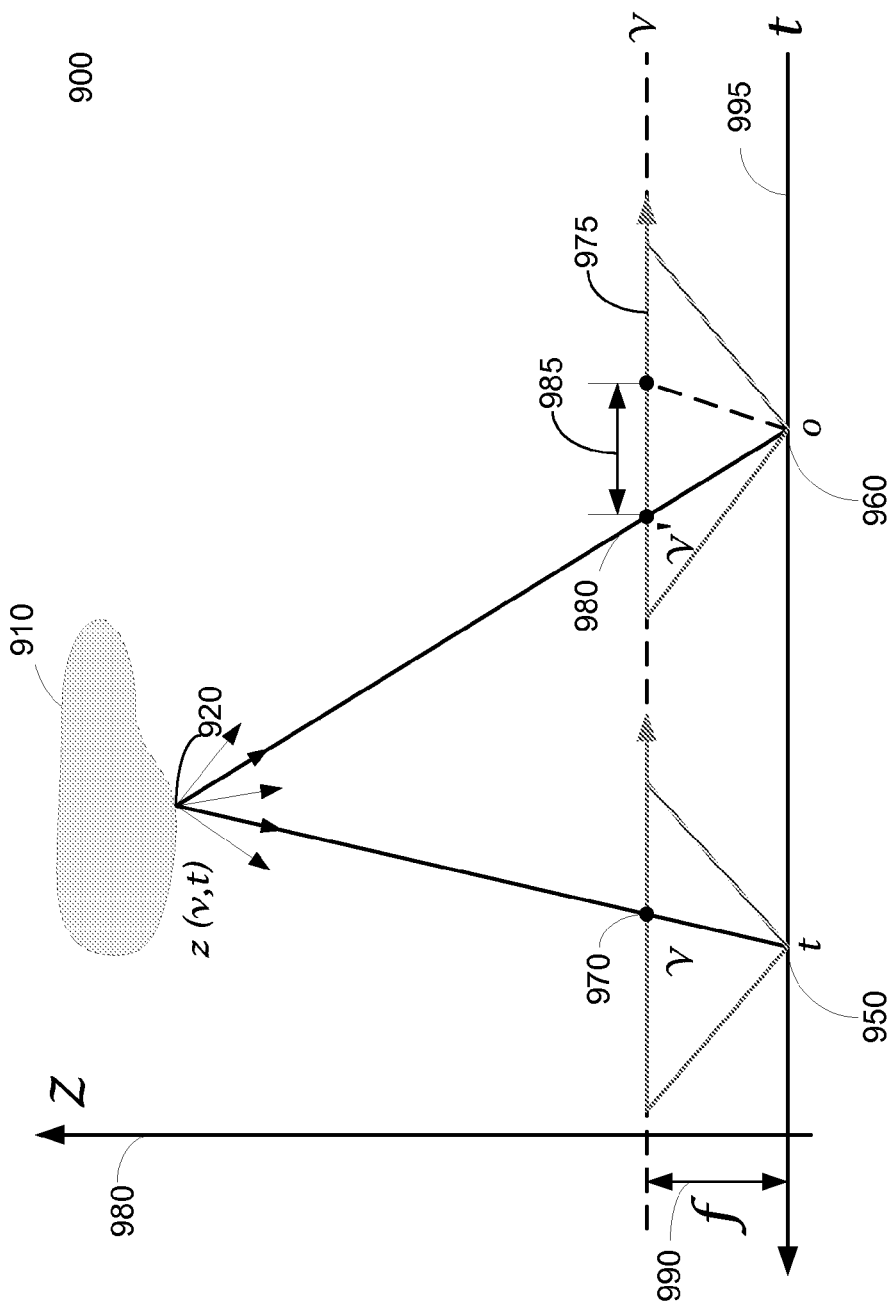
FIG. 9 illustrates an example of a pixel of an image translated to a point of a virtual camera viewpoint in accordance with some embodiments by shifting in a row in accordance with some embodiments.

FIG. 9 illustrates an example mapping 900 of a point or pixel of a reference or actual camera of an image mapped to a pixel or point of a target or virtual camera viewpoint of the image by shifting pixels or points in a row 975 in accordance with some embodiment's. Horizontal dimension 995 comprises a reference or actual camera center 950 and a target or virtual camera center 960. As seen, the target or virtual camera center 960 is located to the right of the reference or actual camera center 950. As such, the target or virtual camera center 960 comprises shifting points or pixels of the image horizontally to the left. Object 910 comprises a point 920. For example, the object 910 may comprise a user as extracted from a video. The point 920 may comprise a feature of the object 910. For example, the point 920 may comprise a point or pixel of a nose, eye, or any other facial feature of the user as depicted in the object 910. Point 970 comprises a point or pixel of the point 920 of the object 910 as seen from the reference or actual camera center 950. Point 980 comprises the point 920 of the object 910 as seen from the target or virtual camera center 960. As such, the pixel or point at point 970 is horizontally shifted an amount 985 to the point 980. In some embodiments, the horizontally shifted amount 985 is determined by the equation for as previously described. In some embodiments, length 990 comprises the focal length f.

As such, the mapping 900 of FIG. 9 comprises a transformation of an image as depicted from a reference or actual camera center to the image as if it were depicted from a target or virtual camera center. In some embodiments, the mapping 900 may comprise a row by row transformation and a column by column transformation. For example, if the transformation only comprises a horizontal shift of the target or virtual camera center to the left of the reference or actual camera center, then only the row by row transformation or mapping may be performed. As such, pixels or points in each row of an image may be mapped or translated to another location in the row such that the mapped location is associated with the target or virtual camera center. Likewise, if the transformation comprises only a vertical shift of the target or virtual camera center downwards from the reference or actual camera center, then only the column by column transformation or mapping may be performed. As such, pixels or points in each column of an image may be mapped to another location in the column such that the mapped location is associated with the target or virtual camera center. However, if the transformation comprises both a horizontal and vertical shift, then both a row by row transformation or mapping and a column by column transformation or mapping may be performed. Thus, the transformation may be restricted to a sequence of one dimensional (e.g., horizontal or vertical) transformations or mappings. In some embodiments, the mapping and thus shift of points or pixels in a row is applied to each point or pixel of each row of an image and the mapping and thus shift of points or pixels in a column is applied to each point or pixel of each column of an image.

Following the mapping methods as previously described, the transformation of an image to the target or virtual camera viewpoint may unveil portions of the image that were not seen by the reference or actual camera. For example, following a shift or transformation, facial regions of a user may comprise an unveiled portion. Such unveiled portions may be referred to as disoccluded regions and pixels within the disoccluded regions may be referred to as disoccluded pixels. In some embodiments, the image comprises an extracted user and, as such, the number of disoccluded pixels is minimized when compared to a transformation or mapping of an entire scene comprising the user foreground and a background.

Multiple methods may be used to address the disoccluded pixels. For example, small disoccluded regions may be filled by using color values from nearby (e.g., neighboring) pixels. In some embodiments, color values of pixels near disoccluded pixels may be averaged together (for example, with weights) and the weighted average color pixel value may be assigned to the disoccluded pixel. In some embodiments, disoccluded regions of a medium size may be filled in with darker colored pixels that may provide the appearance of a shadow in the transformed or mapped image. In some embodiments, the light source associated with the shadow may comprise the reference or actual camera location. For example, the shadow may appear such that it has been created by a light source at the location of the actual camera. In further embodiments, the disoccluded region may simply be ignored. As such, the disoccluded region may comprise a missing portion in the transformed or mapped image. In some embodiments, the missing portion may be inpainted.

Additional post-processing may be performed after the addressing of the disoccluded regions. For example, blurring or bilateral filters may be applied in order to smoothen the transformed or mapped image. Morphological and/or connected component analysis (as previously described) may be used to eliminate artifacts within the transformed or mapped image.

Figure 10:
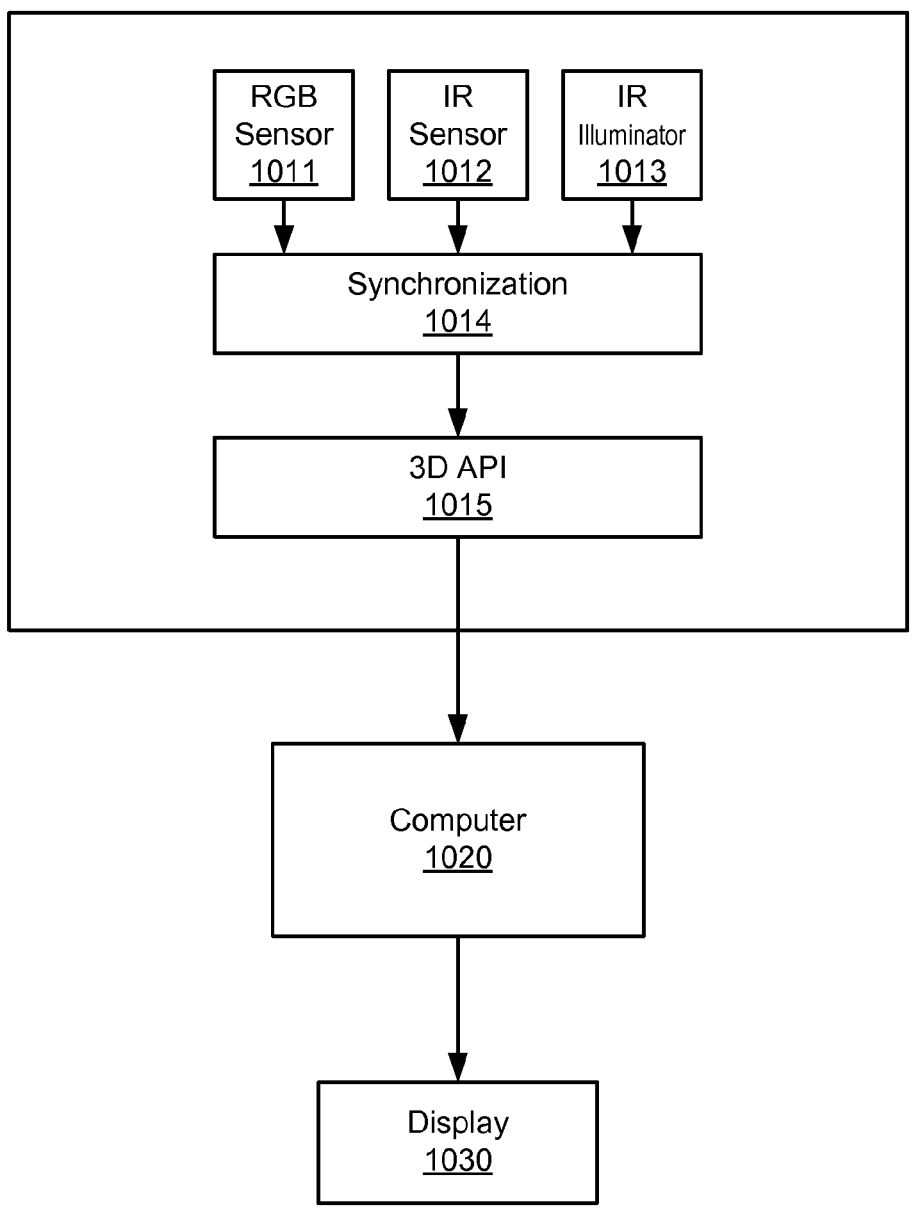
FIG. 10 illustrates an embodiment of a camera system for foreground video embedding in accordance with some embodiments.

FIG. 10 illustrates an embodiment of a camera system 1000 for the foreground video embedding systems and methods of the present invention. In general, the camera system 1000 comprises a camera 1010, computer 1020, and display 1030.

As seen in FIG. 10, a camera 1010 is connected to a computer 1020. The camera 1000 may comprise a three dimensional (3D) camera, depth camera, z-camera, range camera. In some embodiments, the camera 1000 may be comprised of a color or RGB camera and a depth camera or may comprise of a single camera with an RGB sensor and depth sensor. As such, the camera 1000 receives color information and depth information. The received color information may comprise information related to the color of each pixel of a video. In some embodiments, the color information is received from a Red-Green-Blue (RGB) sensor 1011. As such, the RGB sensor 1011 may capture the color pixel information in a scene of a captured video image. The camera 1000 may further comprise an infrared sensor 1012 and an infrared illuminator 1013. In some embodiments, the infrared illuminator 1013 may shine an infrared light through a lens of the camera 1000 onto a scene. As the scene is illuminated by the infrared light, the infrared light will bounce or reflect back to the camera 1000. The reflected infrared light is received by the infrared sensor 1012. The reflected light received by the infrared sensor results in depth information of the scene of the camera 1000. As such, objects within the scene or view of the camera 1000 may be illuminated by infrared light from the infrared illuminator 1013. The infrared light will reflect off of objects within the scene or view of the camera 1000 and the reflected infrared light will be directed towards the camera 1000. The infrared sensor 1012 may receive the reflected infrared light and determine a depth or distance of the objects within the scene or view of the camera 1000 based on the reflected infrared light.

In some embodiments, the camera 1000 may further comprise a synchronization module 1014 to temporally synchronize the information from the RGB sensor 1011, infrared sensor 1012, and infrared illuminator 1013. The synchronization module 1014 may be hardware and/or software embedded into the camera 1000. In some embodiments, the camera 1000 may further comprise a 3D application programming interface (API) 1015 for providing an input-output (IO) structure and interface to communicate the color and depth information to a computer system 1020. The computer system 1020 may process the received color and depth information and comprise and perform the systems and methods disclosed herein. In some embodiments, the computer system 1020 may display the foreground video embedded into the background feed onto a display screen 1030.

Figure 11:
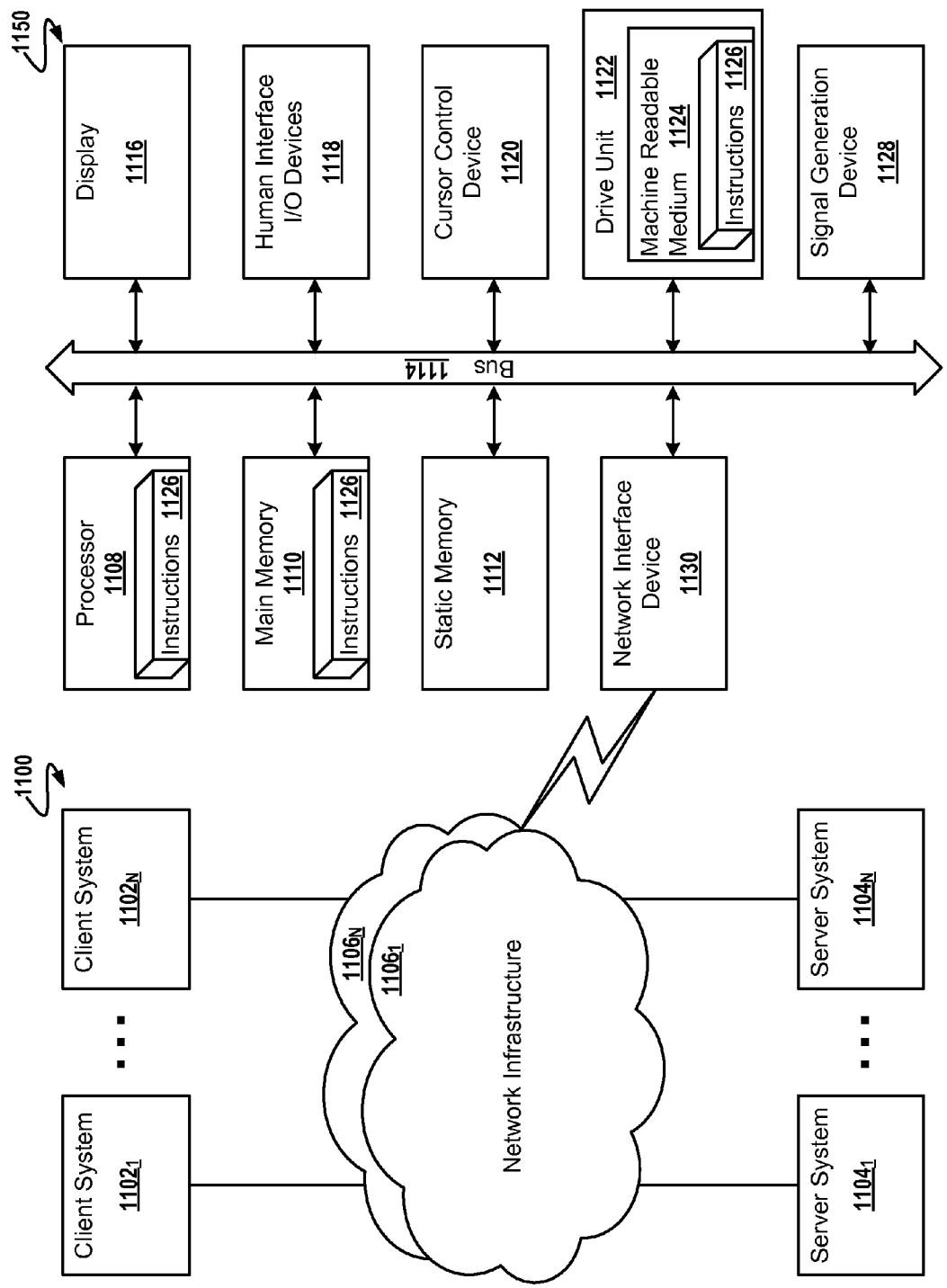
FIG. 11 illustrates an embodiment of a computer system and network system that incorporates the foreground video embedding systems and methods of the present invention.

FIG. 11 is a diagrammatic representation of a network 1100, including nodes for client computer systems $1102_1$ through $1102_N$, nodes for server computer systems $1104_1$ through 1104$_N$, nodes for network infrastructure 1106$_1$ through 1106$_N$, any of which nodes may comprise a machine 1150 within which a set of instructions for causing the machine to perform any one of the techniques discussed above may be executed. The embodiment shown is purely exemplary, and might be implemented in the context of one or more of the figures herein.

Any node of the network 1100 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1150 includes a processor 1108 (e.g. a processor core, a microprocessor, a computing device, etc), a main memory 1110 and a static memory 1112, which communicate with each other via a bus 1114. The machine 1150 may further include a display unit 1116 that may comprise a touch-screen, or a liquid crystal display (LCD), or a light emitting diode (LED) display, or a cathode ray tube (CRT). As shown, the computer system 1150 also includes a human input/output (I/O) device 1118 (e.g. a keyboard, an alphanumeric keypad, etc), a pointing device 1120 (e.g. a mouse, a touch screen, etc), a drive unit 1122 (e.g. a disk drive unit, a CD/DVD) drive, a tangible computer readable removable media drive, an SSD storage device, etc), a signal generation device 1128 (e.g. a speaker, an audio output, etc), and a network interface device 1130 (e.g. an Ethernet interface, a wired network interface, a wireless network interface, a propagated signal interface, etc).

The drive unit 1122 includes a machine-readable medium 1124 on which is stored a set of instructions (i.e. software, firmware, middleware, etc) 1126 embodying any one, or all, of the methodologies described above. The set of instructions 1126 is also shown to reside, completely or at least partially, within the main memory 1110 and/or within the processor 1108. The set of instructions 1126 may further be transmitted or received via the network interface device 1130 over the network bus 1114.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Although the present invention has been described in terms of specific exemplary embodiments, it will be appreciated that various modifications and alterations might be made by those skilled in the art without departing from the spirit and scope of the invention. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method for generating a transformed image, the method comprising:
   receiving, using a computer, a depth image and an input color image of a video from at least one reference camera at a reference camera location, the input color image comprising pixels arranged in rows and columns;
   receiving input identifying a virtual camera location; and
   generating, using the computer, a transformed color image reflecting a viewpoint from the virtual camera location, wherein the generating includes a three dimensional (3D) mapping of the pixels of the input color image to pixels of the transformed color image, wherein the mapping comprises reversing a projection matrix of the at least one reference camera based on depth value—s—of the pixel—s—from the depth image and on the virtual camera location.

2. The method as set forth in claim 1, further comprising correcting spurious depth values of the depth image, the correcting comprising the application of a bilateral filter to regions of the depth image that comprise an unknown depth value.

3. The method as set forth in claim 1, further comprising processing disoccluded pixels of portions of the transformed color image that were not captured by the reference camera, the processing comprising assigning a weighted average pixel color value of nearby pixels of the transformed color image to each disoccluded pixel in the transformed color image.

4. The method as set forth in claim 1, further comprising processing disoccluded pixels of portions of the transformed color image that were not captured by the reference camera, the processing comprising filling in a region comprising disoccluded pixels with an appearance of a shadow such that a light source associated with the shadow corresponds with the reference camera location.

5. A system comprising at least one processor and non-transitory memory, the memory storing instructions that, when executed by the one or more processors, are operative:
   to receive a depth image and an input color image of a video from at least one reference camera at a reference camera location, the input color image comprising pixels arranged in rows and columns;
   to receive input identifying a virtual camera location; and
   to generate a transformed color image reflecting a viewpoint from the virtual camera location, wherein the generating includes a three dimensional (3D) mapping of the pixels of the input color image to pixels of the transformed color image, wherein the mapping comprises reversing a projection matrix of the at least one reference camera based on depth value—s—of the pixel—s— from the depth image and on the virtual camera location.

6. The system as set forth in claim 5, further comprising a module for correcting spurious depth values of the depth image, the correcting comprising the application of a bilateral filter to regions of the depth image that comprise an unknown depth value.

7. The system as set forth in claim 5, further comprising a module for processing disoccluded pixels of portions of the transformed color image that were not captured by the reference camera, the processing comprising assigning a weighted average pixel color value of nearby pixels of the transformed color image to each disoccluded pixel in the transformed color image.

8. The system as set forth in claim 5, further comprising a module for processing disoccluded pixels portions of the transformed color image that were not captured by the reference camera, the processing comprising filling in a region comprising disoccluded pixels with an appearance of a shadow such that a light source associated with the shadow corresponds with the reference camera location.

9. A non-transitory computer readable medium containing one or more instructions, wherein the one or more instructions, when executed by one or more processors, cause the one or more processors to perform the steps of:
receiving, using a computer, a depth image and an input color image of a video from at least one reference camera at a reference camera location;
receiving input identifying a virtual camera location; and
generating, using the computer, a transformed color image reflecting a viewpoint from the virtual camera location, wherein the generating includes a three dimensional (3D) mapping of the pixels of the input color image to pixels of the transformed color image, wherein the mapping comprises reversing a projection matrix of the at least one reference camera based on depth value—s—of the pixel—s—from the depth image and on the virtual camera location.

10. The non-transitory computer readable medium as set forth in claim 9, wherein the steps further comprise correcting spurious depth values of the depth image the correcting comprising the application of a bilateral filter to regions of the depth image that comprise an unknown depth value.

11. The non-transitory computer readable medium as set forth in claim 9, wherein the steps further comprise processing disoccluded pixels of portions of the transformed color image that were not captured by the reference camera, the processing comprising assigning a weighted average pixel color value of nearby pixels of the transformed color image to each disoccluded pixel in the transformed color image.

12. The non-transitory computer readable medium as set forth in claim 9, wherein the steps further comprise processing disoccluded pixels of portions of the transformed color image that were not captured by the reference camera, the processing comprising filling in a region comprising disoccluded pixels with an appearance of a shadow such that a light source associated with the shadow corresponds with the reference camera location.

13. The method of claim 1, wherein the virtual camera location is displaced vertically from the reference camera location.

14. The method of claim 1, wherein the virtual camera location is displaced horizontally from the reference camera location.

15. The method of claim 1, wherein the virtual camera location is displaced both horizontally and vertically from the reference camera location.

16. The system of claim 5, wherein the virtual camera location is displaced vertically from the reference camera location.

17. The system of claim 5, wherein the virtual camera location is displaced horizontally from the reference camera location.

18. The system of claim 5, wherein the virtual camera location is displaced both horizontally and vertically from the reference camera location.

19. The non-transitory computer readable medium of claim 9, wherein the virtual camera location is displaced vertically from the reference camera location.

20. The non-transitory computer readable medium of claim 9, wherein the virtual camera location is displaced horizontally from the reference camera location.

21. The non-transitory computer readable medium of claim 9, wherein the virtual camera location is displaced both horizontally and vertically from the reference camera location.

* * * * *

UNITED STATES PATENT AND TRADEMARK OFFICE
CERTIFICATE OF CORRECTION

| | | |
|---|---|---|
| PATENT NO. | : 9,053,573 B2 | Page 1 of 1 |
| APPLICATION NO. | : 13/098363 | |
| DATED | : June 9, 2015 | |
| INVENTOR(S) | : Dennis Lin et al. | |

It is certified that error appears in the above-identified patent and that said Letters Patent is hereby corrected as shown below:

In the claims,

Col. 16,

Claim 1, Line 36, change "value---s---of" to -- values of --.

Claim 1, Line 37, change "pixel-s-from" to -- pixels from --.

Col. 17,

Claim 5, Line 5, change "value---s---of--the pixel----s---" to -- values of the pixels --.

Claim 9, Lines 40-41, change "value--s--of" to -- values of -- and change "pixel--s--from" to -- pixels from --.

Signed and Sealed this
Thirteenth Day of October, 2015

Michelle K. Lee
*Director of the United States Patent and Trademark Office*